Oct. 3, 1939.  M. R. McDANAL  2,174,799
OPHTHALMIC MOUNTING
Filed Aug. 2, 1937
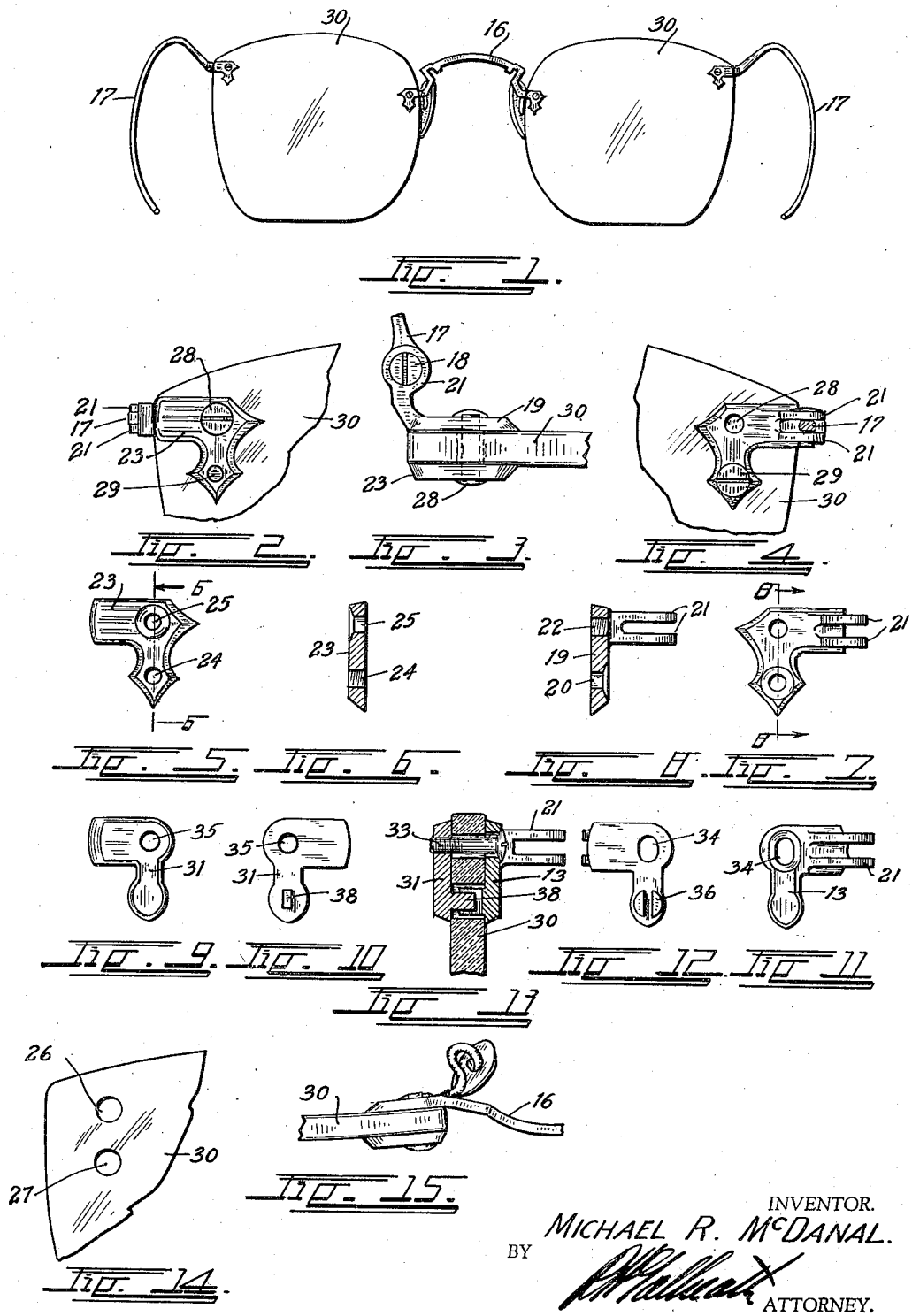
INVENTOR.
MICHAEL R. McDANAL.
BY
ATTORNEY.

Patented Oct. 3, 1939

2,174,799

UNITED STATES PATENT OFFICE 2,174,799

OPHTHALMIC MOUNTING

Michael R. McDanal, Denver, Colo.

Application August 2, 1937, Serial No. 156,987

3 Claims. (Cl. 88—47)

This invention relates to an ophthalmic mounting and more particularly to a mounting applicable to rimless spectacles.

In the usual rimless mounting the temple and bridge members are clamped around the edge of the lens by means of a single clamp screw. The members are formed with straps which bear against the edge of the lens. Since lenses vary in shape and thickness this construction necessitates reshaping and reforming of the temple and bridge members to fit each individual lens. The principal object of the present invention is to eliminate all parts of the mounting which lie against or pass around the edge of the lens so that the mounting may be applied to lenses of any shape and thickness without requiring reshaping or reforming.

A further object is to provide a lens mounting which will eliminate chipping or cracking of the lens edge and which will provide a tight, rigid and substantial attachment.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a front view of a pair of rimless spectacles illustrating the invention applied thereto.

Fig. 2 is an enlarged detail front view of the temple mounting.

Fig. 3 is a plan view of the temple mounting.

Fig. 4 is a rear view of the temple mounting.

Fig. 5 is a detail front view of the front piece of the temple mounting.

Fig. 6 is a section through the front piece taken on the line 6—6, Fig. 5.

Fig. 7 is a rear view of the back piece of the temple attachment.

Fig. 8 is a section therethrough taken on the line 8—8, Fig. 7.

Fig. 9 is a detail front view of an alternate form of the front piece.

Fig. 10 is a rear view thereof.

Fig. 11 is a rear view of the back piece of the alternate form.

Fig. 12 is a front view of the back piece of the alternate form.

Fig. 13 is a detail section through the lens edge illustrating the alternate form in place thereon.

Fig. 14 is a fragmentary view of the lens illustrating the drilling required for the improved mounting.

Fig. 15 is a detail top view of the connection between the nose piece and the lens.

Typical spectacle lenses are indicated on the drawing at 30, a typical nose bridge at 16 and the usual temple bows at 17. This invention relates specifically to the means for attaching the bridge 16 and the bows 17 to the lenses 30.

In the first form of the invention the bows 16 are hinged upon a suitable hinge screw 18 to a back piece 19. The portion of the back piece 19 which engages the lens is L-shaped, that is, it has a downwardly depending leg, which terminates in a counter-sunk screw hole 20, and a horizontally extending leg which terminates in a hinge bracket 21. At the angle of the back piece immediately above the screw hole 20 is a threaded screw socket 22. The back piece cooperates with a front piece 23, which is shown in detail in Figs. 5 and 6.

The front piece 23 is also L-shaped so that when positioned on the lens opposite the back piece it will lie over and conceal the latter. The downwardly depending leg of the front piece terminates in a threaded screw socket 24 in its lower end and a counter-sunk screw hole 25 at its upper angle.

The lens is prepared for receiving the front and back pieces, as shown in Fig. 14, with an upper screw aperture or hole 26 and a lower screw hole 27 spaced-apart a distance equal to the spacing of the screw openings in the front and back pieces. The screw holes for the temple mountings are located within the upper outside quadrant of said lens adjacent the edge. The screw holes for the bridge mounting are located above the center line of the lens.

When in place on the lens an upper screw 28 is passed through the screw hole 25 in the front piece, and threaded into the screw hole 22 in the back piece. A lower screw 29 is passed from the rear of the lens through the screw hole 20 in the back piece and threaded into the screw socket 24 of the front piece. These screws may be upset or riveted over to maintain them in place as is usual in spectacle practice.

It can be readily seen that this construction will rigidly secure the back piece 19 and the bow 17 to the lens so that it cannot move in any direction and yet there are no portions of the device over-lapping or over-lying the lens edge.

The nose bridge 16 is secured to the lenses, as shown in Fig. 5, in exactly the same manner by having the nose bridge attached to or formed on the back piece of the mounting similarly to the manner in which the hinge bracket 21 is carried by the back piece of the temple mounting described.

As illustrated and described the upper screw is passed through from the front and the lower screw is passed through from the back. This is simply a matter of choice and the same results could be obtained by reversing the procedure and passing the upper screw through from the back and the lower screw through from the front and if desired, both screws could be inserted from the same side. A corresponding change being made, of course, in the screw holes in the front and back pieces.

In Figs. 9 to 13 inclusive, a second form of the invention is illustrated having a front piece 31 and a back piece 13. In this form, however, only one screw 33, is employed which passes through one piece and is threaded into the other, as illustrated. The screw 33 passes through an elongated, counter-sunk screw hole 34 in one piece and into a threaded receiving socket 35 in the other piece.

The back piece is formed with a bifurcated lug 36 which extends into the lower lens hole 27 and the front piece is provided with a tongue 38 which extends into the bifurcation of the lug 36.

When the device is assembled, this construction serves the same purpose as the first form but eliminates one screw in each mounting. The screw being replaced by the lug 36 and the tongue 38. The elongated screw hole 34 accommodates inaccuracy in the spacing of the lens holes. For this same purpose the tongue 38 is made narrower than the width of the lug 36 and the bifurcation is parallel to the center line of the holes 26 and 27 to allow for a slight upward or downward relative movement between the front and back pieces to accommodate any inaccuracy in drilling.

In some instances it is contemplated to make the lug 36 and the tongue 38 of fusible metal or to coat them with solder. The two can then be permanently joined by applying the necessary heat to the mounting.

The mountings may have any desired design.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A mounting for securing a temple bow to a spectacle lens comprising: a back plate against the back face of said lens; a bracket extending from said back plate; a hinge for securing a temple bow to said bracket; a front plate against the front face of said lens, said lens having two perforations extending completely through said lens between said plates; a clamping screw extending from one of said plates through one of said perforations and threaded into the other of said plates; a bifurcated stud extending from one of said plates into the second perforation; and a tongue member extending from the other of said plates into the said second perforation and into the bifurcation in said stud, to prevent said plates from rotating on the face of said lenses, said front and back plates being unconnected except by the means extending through the perforations in said lens, said mounting, with the exception of said hinge, being wholly within the periphery of the lens.

2. A mounting for a spectacle lens having a vertically aligned pair of apertures adjacent one edge thereof comprising: an L-shaped back plate having a vertical perforated portion overlying said apertures on the back of said lens and a horizontal portion extending from said vertical portion toward the adjacent edge of said lens; means for hingedly mounting a temple bow on the extremity of said horizontal portion at the edge of said lens; a front plate overlying said perforations on the front face of said lens; a clamp screw extending through one of said perforations between said two plate to clamp the latter against said lens; and means extending from said plates into the second aperture to prevent rotation of said plates, said front and back plates being unconnected except by the means extending through said perforations, said mounting, exclusive of said hinge means, being wholly within the periphery of said lens.

3. An ophthalmic mounting comprising: a lens having a pair of vertically aligned apertures adjacent a vertical edge thereof; an inverted-L-shaped back plate; a perforated vertical portion on said back plate overlying said apertures; a horizontal portion on said back plate extending from a point on the vertical portion opposite the upper aperture outward toward the edge of said lens; a hinge on the outer extremity of the horizontal portion at the edge of said lens; a temple bow extending rearwardly from said hinge; a front plate; and means extending through said apertures for supporting said plates on said lens, said front and back plates being unconnected except by the means extending through said perforations, said mounting, exclusive of said hinge means, being wholly within the periphery of said lens.

MICHAEL R. McDANAL.